(12) United States Patent
Kellogg

(10) Patent No.: US 11,618,143 B1
(45) Date of Patent: Apr. 4, 2023

(54) WHEEL PULLER

(71) Applicant: David Kellogg, Daphne, AL (US)

(72) Inventor: David Kellogg, Daphne, AL (US)

( * ) Notice: Subject to any disclaimer, the term of this patent is extended or adjusted under 35 U.S.C. 154(b) by 0 days.

(21) Appl. No.: 17/508,089

(22) Filed: Oct. 22, 2021

(51) Int. Cl.
*B25B 27/02* (2006.01)
*B60B 29/00* (2006.01)

(52) U.S. Cl.
CPC .......... *B25B 27/023* (2013.01); *B60B 29/008* (2013.01)

(58) Field of Classification Search
CPC ...... B25B 27/00; B25B 27/023; B60B 29/008
USPC .................................. 29/255, 252, 278, 265
See application file for complete search history.

(56) References Cited

U.S. PATENT DOCUMENTS

| | | | | |
|---|---|---|---|---|
| 4,916,791 A | * | 4/1990 | Clouse | B25B 27/062 29/261 |
| 5,419,027 A | * | 5/1995 | McPeak | B25B 27/023 29/261 |
| 6,357,097 B1 | | 3/2002 | Lundgreen et al. | |
| 7,685,688 B2 | | 3/2010 | Fan | |
| 7,770,277 B2 | * | 8/2010 | Wridt | B25B 27/023 29/261 |
| 7,996,972 B2 | * | 8/2011 | Hu | B25B 27/026 29/259 |
| 8,079,123 B2 | * | 12/2011 | Lin | B25B 27/02 29/259 |
| 8,464,411 B2 | | 6/2013 | Betcher et al. | |
| 8,745,832 B2 | | 6/2014 | Barrios et al. | |
| 9,539,709 B2 | | 1/2017 | Campoli | |
| 9,757,849 B2 | * | 9/2017 | Stepp | B25B 27/026 |
| 10,137,730 B2 | * | 11/2018 | Liukas | B25B 27/0028 |
| 2011/0131783 A1 | | 6/2011 | Betcher et al. | |
| 2011/0133139 A1 | | 6/2011 | Betcher et al. | |

* cited by examiner

*Primary Examiner* — Anne M Kozak
*Assistant Examiner* — Christopher Soto
(74) *Attorney, Agent, or Firm* — Cramer Patent & Design, PLLC; Aaron R. Cramer

(57) ABSTRACT

The wheel puller with adjustable separation angle and separation distance may comprise a center assembly, a left pull arm, and a right pull arm. The wheel puller may be operable to pull a wheel off of a hub of a vehicle by coupling a left wheel hook and a right wheel hook to holes on the wheel and pressing a hub rest located on the center assembly against the hub of the wheel. When a threaded shaft of the center assembly is turned the left wheel hook and the right wheel hook may pull the wheel away from the vehicle. A separation angle between the left pull arm and the right pull arm and a separation distance between the left wheel hook and the right wheel hook may be changed such that the wheel puller may accommodate various sizes and configurations of wheels.

20 Claims, 3 Drawing Sheets

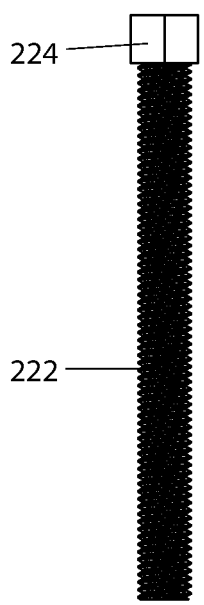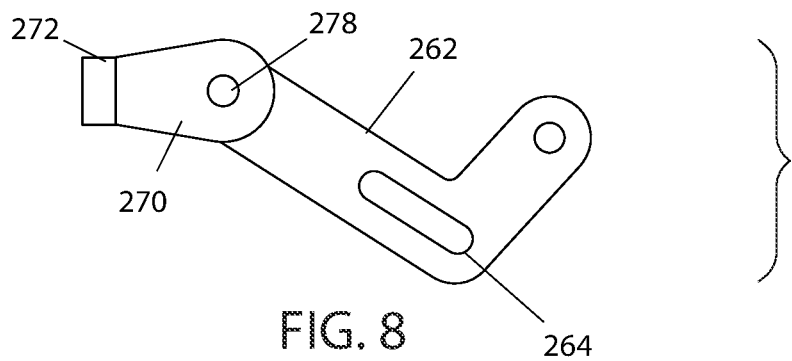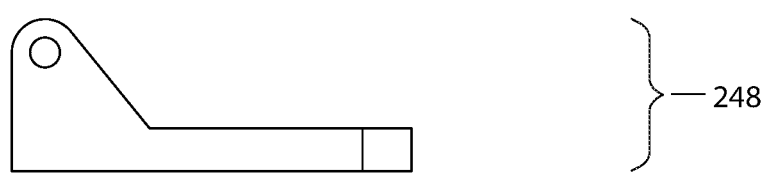
FIG. 7
FIG. 8
FIG. 9
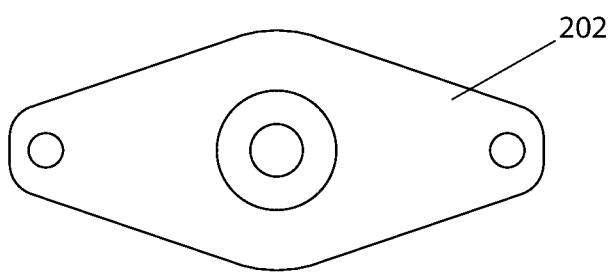
FIG. 10
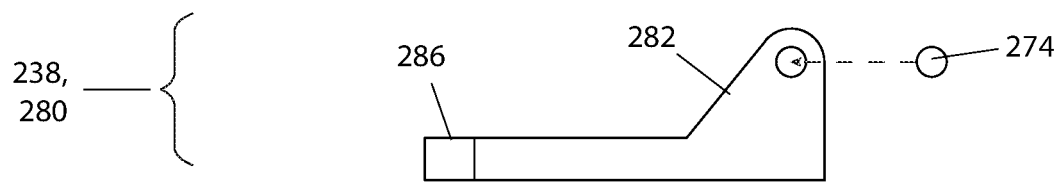
FIG. 11
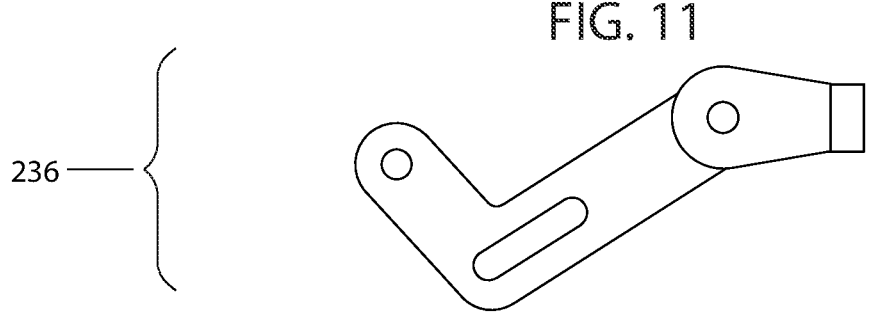
FIG. 12

WHEEL PULLER

RELATED APPLICATIONS

None.

FIELD OF THE INVENTION

The present invention relates generally to a pulling device and specifically to a wheel pulling device.

BACKGROUND OF THE INVENTION

As anyone who performs a lot of mechanical work will attest, nothing beats having the proper tool for a job. The proper tool can save time, save money, produce a higher quality job, reduce damage to equipment, and provide for the increased safety of the worker. Each field of mechanical work has its own type of specialty tools, each performing a specialized task. One field where there has been a need for such a specialized tool is when removing rusted on or seized wheel rims from motor vehicles.

While a wheel rim can become stuck on any type of vehicle, large semi-trucks and their associated trailers are frequently seen problems due to their large size. While hammering and pry bars are frequently employed to loosen such rims, risk of damage to the rim and the vehicle itself is possible. Additionally, the process of hammering and prying places a great deal of stress and strain on the worker as well. Damage to muscles, tendons and the skeletal structure are quite possible with long-lasting and costly effects. Accordingly, there exists a need for a means by which a stuck-on wheel rims can be easily removed from trucks and other motor vehicles without the problems as described above. The development of the wheel puller fulfills this need.

SUMMARY OF THE INVENTION

To achieve the above and other objectives, the present invention provides for a wheel puller which has a center assembly which also has a hub rest, a hub rest bracket, a threaded shaft, a left riser guide arm, and a right riser guide arm, a left pull arm which has a left wheel hook, a right pull arm has a right wheel hook, the right riser arm, a right riser adjust arm, and a right riser swivel arm, a riser adjust pivot armature which is pivotably coupled to the riser coupler of a riser arm via a riser pivot pin. As the distance between the threaded shaft aperture on the riser adjust arm and the swivel arm aperture on the riser swivel arm decreases, the riser adjust pivot armature pivots such that the riser pivot pin pulls the riser arm away from the vehicle.

The wheel puller is operable to pull the wheel off of a hub of a vehicle. The hub rest presses against a hub of a wheel and the hub rest bracket includes a top plate and a bottom plate. The left riser arm, a left riser adjust arm, and a left riser swivel arm, the left riser adjust arm and the left riser swivel arm are coupled to the threaded shaft via a threaded shaft aperture located on a riser coupler of the riser adjust arm. The left wheel hook and the right wheel hook couple to a plurality of corresponding holes disposed on the wheel. The riser swivel arm couples to the threaded shaft via a swivel arm aperture on the riser swivel arm.

The hub rest may press against the hub when a threaded shaft is turned while the left wheel hook and the right wheel hook pull the wheel away from the vehicle. Rotation of the threaded shaft in a first rotational direction may cause the left pull arm and the right pull arm to pull the left wheel hook and the right wheel hook, respectively, in a direction that moves the left wheel hook and the right wheel hook away from the vehicle. The hub rest may be a contact point between the wheel puller and the hub of the wheel and stabilizes the wheel puller while pressing against the hub while the wheel puller is in use. The hub rest may be coupled to the bottom plate of the hub rest bracket. The threaded shaft may be rotationally coupled to the center of the top plate. The top plate may be parallel to the bottom plate. The top plate may be coupled to the bottom plate via a left guide swivel pin and a right guide swivel pin. The threaded shaft may be a threaded rod that is rotationally coupled to the top plate of the hub rest bracket at a proximal end of the threaded shaft.

A distal end of the threaded shaft may include a head where the tool is detachably coupled. The left riser guide arm may restrain lateral movement of a left riser arm and, specifically, limits movement of the left riser guide arm to be parallel to the orientation of the threaded shaft and/or to be in a radial direction towards or away from the vehicle. The left riser guide arm may pivotably couple to the hub rest bracket via the left guide swivel pin that passes through a left guide swivel aperture and passes through a left guide slot which is elongated to permit radial movement of the left riser arm. The right riser guide arm may restrain lateral movement of a right riser arm and, specifically, may limit movement of the right riser guide arm to be parallel to the orientation of the threaded shaft and/or to be in a radial direction towards or away from the vehicle. The right riser guide arm may be pivotably coupled to the hub rest bracket via the right guide swivel pin that passes through a right guide swivel aperture and passes through a right guide slot which is elongated to permit radial movement of the right riser arm. The left pull arm may pull the wheel away from the vehicle using the left wheel hook when the threaded shaft is turned in a first rotational direction. The left wheel hook may move towards the vehicle when the threaded shaft is turned in a second rotational direction such that clearance is created to position the left wheel hook behind the wheel.

The right pull arm may pull the wheel away from the vehicle using the right wheel hook when the threaded shaft is turned in the second rotational direction. The right wheel hook may move towards the vehicle when the threaded shaft is turned in the second rotational direction such that clearance is created to position the right wheel hook behind the wheel. A separation angle between the left pull arm and the right pull arm may be changed such that the wheel puller may be operable to pull the wheel on the vehicle where the corresponding holes and the hub are not linearly aligned. A separation distance between the left wheel hook and the right wheel hook may be changed to accommodate the wheel regardless of the wheel's size.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 7 is a front detail view of a wheel puller, according to an embodiment of the present invention illustrating the threaded shaft;

FIG. 8 is a front detail view of a wheel puller with adjustable separation angle and separation distance, according to an embodiment of the present invention illustrating the right riser adjust arm;

FIG. 9 is a front detail view of a wheel puller, according to an embodiment of the present invention illustrating the right riser swivel arm;

FIG. 10 is a top detail view of a wheel puller, according to an embodiment of the present invention illustrating the top plate;

FIG. 11 is a front detail view of a wheel puller, according to an embodiment of the present invention illustrating the left riser swivel arm; and FIG. 12 is a front detail view of a wheel puller, according to an embodiment of the present invention illustrating left riser adjust arm.

Figure 1:
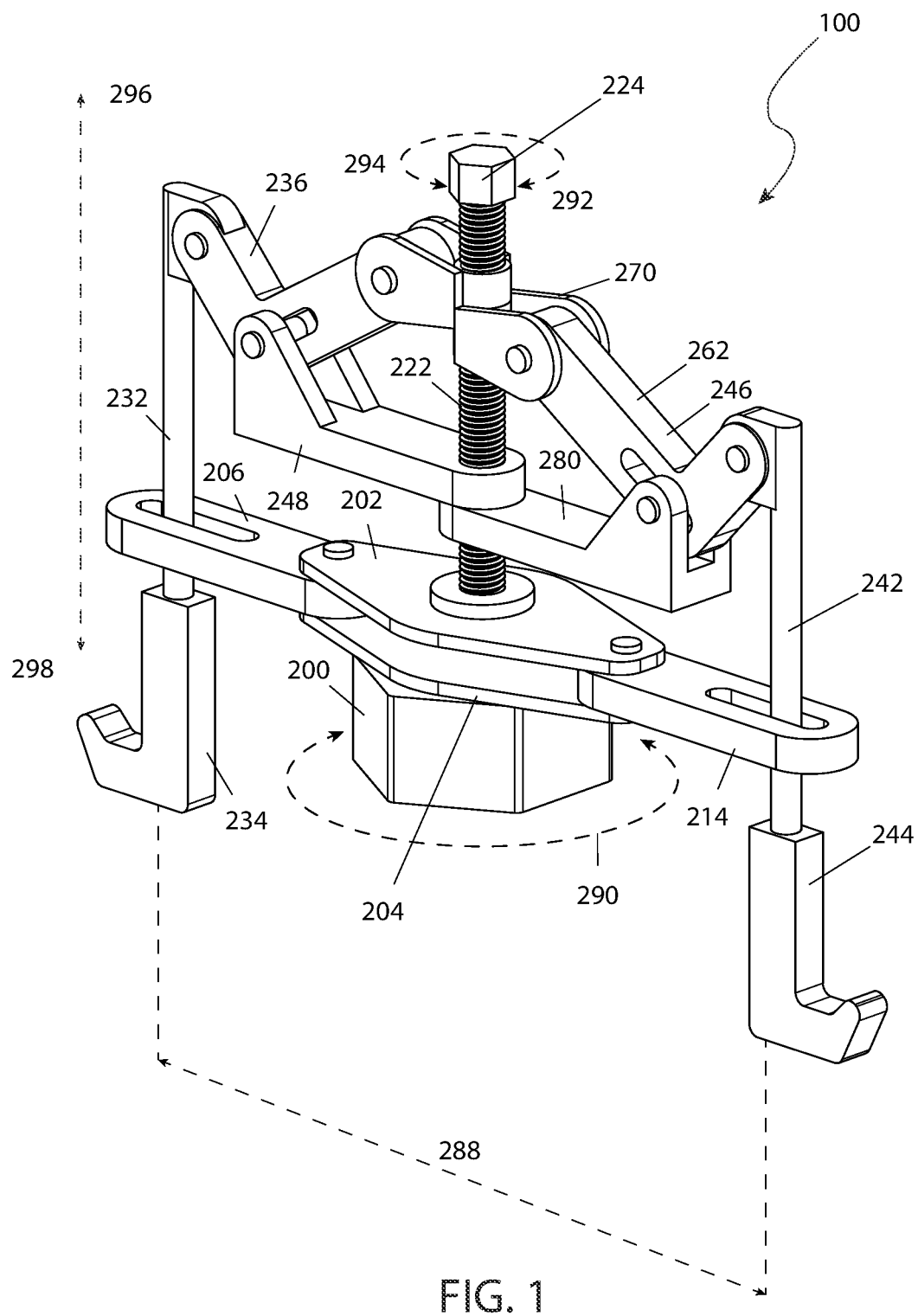
FIG. 1 is an isometric view of a wheel puller, according to an embodiment of the present invention.
Figure 2:
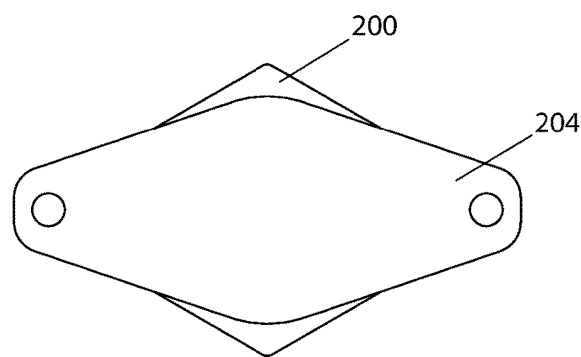
FIG. 2 is a top detail view of a wheel puller, according to an embodiment of the present invention illustrating the hub rest and the bottom plate.
Figure 3:
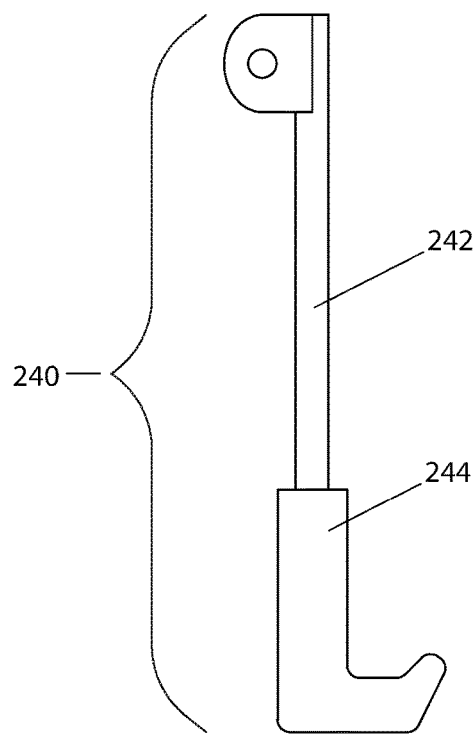
FIG. 3 is a front detail view of a wheel puller, according to an embodiment of the present invention illustrating the right pull arm.
Figure 4:
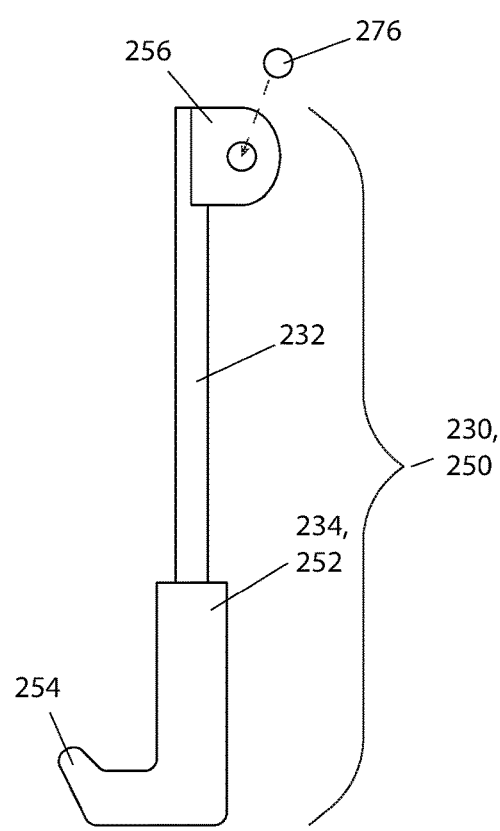
FIG. 4 is a front detail view of a wheel puller, according to an embodiment of the present invention illustrating the left pull arm.
Figure 5:
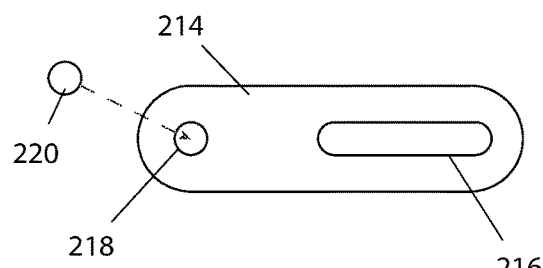
FIG. 5 is a top detail view of a wheel puller, according to an embodiment of the present invention illustrating the right riser guide arm.
Figure 6:
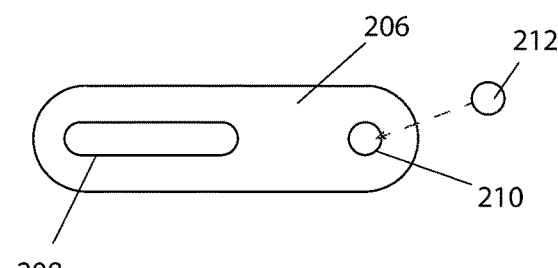
FIG. 6 is a top detail view a wheel puller, according to an embodiment of the present invention illustrating the left riser guide arm.

DESCRIPTIVE KEY 100 wheel puller
200 hub rest
202 top plate
204 bottom plate
206 left riser guide arm
208 left guide slot
210 left guide swivel aperture
212 left guide swivel pin
214 right riser guide arm
216 right guide slot
218 right guide swivel aperture
220 right guide swivel pin
222 threaded shaft
224 head
230 left pull arm
232 left riser arm
234 left wheel hook
236 left riser adjust arm
238 left riser swivel arm
240 right pull arm
242 right riser arm
244 right wheel hook
246 right riser adjust arm
248 right riser swivel arm
250 riser arm
252 wheel hook
254 hook end
256 riser coupler
260 riser adjust arm
262 riser adjust pivot armature
264 adjustment slot
270 riser adjust arm coupler
272 threaded shaft aperture
274 adjustment pin
276 riser pivot pin
278 riser adjust coupler pin
280 riser swivel arm
282 riser adjust support
286 swivel arm aperture
288 separation distance
290 separation angle
292 first rotational direction
294 second rotational direction
296 first linear direction
298 second linear direction

DESCRIPTION OF THE INVENTION

The present invention is directed to a wheel puller with adjustable separation angle and separation distance (herein described as the "invention") 100. The invention 100 may comprise a center assembly, a left pull arm 230, and a right pull arm 240. The invention 100 may be operable to pull a wheel off of a hub of a vehicle. A left wheel hook 234 located on the left pull arm 230 and a right wheel hook 244 located on the right pull arm 240 may couple to holes on the wheel. A hub rest 200 located on the center assembly may press against the hub of the wheel. The hub rest 200 may press against the hub when a threaded shaft 222 is turned while the left wheel hook 234 and the right wheel hook 244 pull the wheel away from the vehicle. The threaded shaft 222 may be turned using a tool. As a non-limiting example, the tool may be an impact wrench. A separation angle 290 between the left pull arm 230 and the right pull arm 240 may be changed such that the invention 100 may be operable to pull the wheel on the vehicles where the holes and the hub are not linearly aligned. A separation distance 288 between the left wheel hook 234 and the right wheel hook 244 may be changed such that wheels of various sizes may be accommodated.

The center assembly may comprise the hub rest 200, a hub rest bracket, the threaded shaft 222, a left riser guide arm 206, and a right riser guide arm 214. The hub rest 200 may press against the hub of the wheel. Rotation of the threaded shaft 222 in a first rotational direction 292 may cause the left pull arm 230 and the right pull arm 240 to pull the left wheel hook 234 and the right wheel hook 244, respectively, in a direction that moves the left wheel hook 234 and the right wheel hook 244 away from the vehicle.

The hub rest 200 may be a contact point between the invention 100 and the hub of the wheel. The hub rest 200 may stabilize the invention 100 and may press against the hub while the invention 100 is in use. The hub rest 200 may be coupled to a bottom plate 204 of the hub rest bracket.

The hub rest bracket may comprise a top plate 202 and the bottom plate 204. The threaded shaft 222 may be rotationally coupled to the center of the top plate 202. The top plate 202 may be parallel to the bottom plate 204. The top plate 202 may be coupled to the bottom plate 204 via a left guide swivel pin 212 and a right guide swivel pin 220.

The threaded shaft 222 may be a threaded rod that may be rotationally coupled to the top plate 202 of the hub rest bracket at a proximal end of the threaded shaft 222. A distal end of the threaded shaft 222 may comprise a head 224 where the tool may detachably couple. In some embodiments, the head 224 of the threaded shaft 222 may be a hexagonal shape.

The left riser guide arm 206 may restrain lateral movement of a left riser arm 232 and, specifically, may limit movement of the left riser guide arm 206 to be parallel to the orientation of the threaded shaft 222 and/or to be in a radial direction towards or away from the vehicle. The left riser guide arm 206 may pivotably couple to the hub rest bracket via the left guide swivel pin 212 that passes through a left guide swivel aperture 210. The left riser arm 232 may pass through a left guide slot 208 which is elongated to permit radial movement of the left riser arm 232.

The right riser guide arm 214 may restrain lateral movement of a right riser arm 242 and, specifically, may limit movement of the right riser guide arm 214 to be parallel to the orientation of the threaded shaft 222 and/or to be in a radial direction towards or away from the vehicle. The right riser guide arm 214 may pivotably couple to the hub rest bracket via the right guide swivel pin 220 that passes through a right guide swivel aperture 218. The right riser arm 242 may pass through a right guide slot 216 which is elongated to permit radial movement of the right riser arm 242.

The left pull arm 230 comprises the left riser arm 232, a left riser adjust arm 236, and a left riser swivel arm 238. The left pull arm 230 may pull the wheel away from the vehicle using the left wheel hook 234 when the threaded shaft 222 is turned in the first rotational direction 292. The left wheel hook 234 may move towards the vehicle when the threaded shaft 222 is turned in a second rotational direction 294 such that clearance is created to position the left wheel hook 234 behind the wheel.

The right pull arm 240 comprises the right riser arm 242, a right riser adjust arm 246, and a right riser swivel arm 248. The right pull arm 240 may pull the wheel away from the vehicle using the right wheel hook 244 when the threaded shaft 222 is turned in the second rotational direction 294. The right wheel hook 244 may move towards the vehicle when the threaded shaft 222 is turned in the second rotational direction 294 such that clearance is created to position the right wheel hook 244 behind the wheel.

The following explains the movements of an individual pull arm selected from the left pull arm 230 and the right pull arm 240. The individual pull arm may move a wheel hook 252 in a first linear direction 296 when the threaded shaft 222 is turned in the first rotational direction 292 and may move the wheel hook 252 in a second linear direction 298 when the threaded shaft 222 is turned in the second rotational direction 294. The wheel hook 252 may comprise a hook end 254 that may be placed behind the wheel such that the wheel may be pulled by movement of the wheel hook 252 in the first linear direction 296.

A riser adjust arm 260 and a riser swivel arm 280 may be coupled to the threaded shaft 222. The riser adjust arm 260 may couple to the threaded shaft 222 via a threaded shaft aperture 272 located on a riser coupler 256 of the riser adjust arm 260. The threaded shaft aperture 272 may be threaded with a thread that complements the threading of the threaded shaft 222. The riser adjust arm 260 may therefore move along the threaded shaft 222 when the threaded shaft 222 is turned relative to the riser adjust arm 260.

The riser swivel arm 280 may couple to the threaded shaft 222 via a swivel arm aperture 286 on the riser swivel arm 280. The swivel arm aperture 286 may be an unthreaded aperture having a larger diameter than the diameter of the threaded shaft 222 such that the threaded shaft 222 may free spin within the swivel arm aperture 286.

A riser adjust arm coupler 270 may be pivotably coupled to a riser adjust pivot armature 262 via a riser adjust coupler pin 278. The riser adjust pivot armature 262 may comprise an adjustment slot 264. The riser adjust pivot armature 262 may be slidably coupled to riser adjust supports 282 on the riser swivel arm 280 via an adjustment pin 274. The riser adjust pivot armature 262 of the riser adjust arm 260 may pivot and/or slide as the distance between the threaded shaft aperture 272 and the swivel arm aperture 286 measured along the threaded shaft 222 changes.

The riser adjust pivot armature 262 may be pivotably coupled to the riser coupler 256 of a riser arm 250 via a riser pivot pin 276. As the distance between the threaded shaft aperture 272 on the riser adjust arm 260 and the swivel arm aperture 286 on the riser swivel arm 280 decreases, the riser adjust pivot armature 262 may pivot such that the riser pivot pin 276 pulls the riser arm 250 away from the vehicle. The distance between the threaded shaft aperture 272 on the riser adjust arm 260 and the swivel arm aperture 286 on the riser swivel arm 280 may decrease as the threaded shaft 222 is turned in the first rotational direction 292, the riser adjust arm 260 moves towards the vehicle, and the riser swivel arm 280 is prevented from moving towards the vehicle by the hub rest bracket.

Because the threaded shaft 222 may be turned by hand and because the riser swivel arm 280 is free to move along the threaded shaft 222, a user may easily adjust the riser arm 250 to fit the wheel. The separation distance 288 between the left pull arm 230 and the right pull arm 240 may be changed to fit the holes in the wheel by adjusting the distance between the threaded shaft aperture 272 and the swivel arm aperture 286 on both the left pull arm 230 and the right pull arm 240. The separation angle 290 between the left pull arm 230 and the right pull arm 240 may be changed to fit the holes in the wheel by pivoting the left pull arm 230, the right pull arm 240, or both around the threaded shaft 222. The riser adjust arm 260 and the riser swivel arm 280 may pivot to the separation angle 290 and an individual guide arm selected from the left riser guide arm 206 and the right riser guide arm 214 may also pivot to align with the riser arm 250.

On vehicles having dual wheels, the invention 100 may be operable to reach through the holes in an outer dual wheel and grab the holes on an inner dual wheel such that both the outer dual wheel and the inner dual wheel may be pulled off at the same time. On vehicles having 5-point wheels or other arrangements where the holes on the wheel may not align with the hub, the invention 100 may be operable to grasp the holes after the separation angle 290 has been changed to align the left pull arm 230 and the right pull arm 240 with the holes and the hub rest 200 with the hub.

In use, the invention 100 may be adjusted to fit a wheel by manually moving the left riser swivel arm 238 and the right riser swivel arm 248, by manually rotating the threaded shaft 222, and by manually moving the left riser guide arm 206 and the right riser guide arm 214 until the hub rest 200 is positioned against the hub of the wheel and the left wheel hook 234 and the right wheel hook 244 are hooked to holes in the wheel. The adjustment may determine the separation distance 288 and the separation angle 290 of the left pull arm 230 and the right pull arm 240. The threaded shaft 222 may be turned manually until the left wheel hook 234, the right wheel hook 244, and the hub rest 200 are all snug against the wheel. A tool may be coupled to the head 224 of the threaded shaft 222 and may turn the threaded shaft 222 in the first rotational direction 292. As a non-limiting example, the tool may be an impact wrench. As the threaded shaft 222 is turned in the first rotational direction 292, the left wheel hook 234 and the right wheel hook 244 may move in the first linear direction 296 and may pull the wheel from the hub.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A wheel puller, comprising:
a center assembly having a hub rest, a hub rest bracket, a threaded shaft, a left riser guide arm, and a right riser guide arm, the hub rest is configured to be pressed against a hub of a wheel and the hub rest bracket includes a top plate and a bottom plate;
a left pull arm having a left wheel hook, a left riser arm, a left riser adjust arm, and a left riser swivel arm, the left riser adjust arm and the left riser swivel arm are coupled to the threaded shaft via a threaded shaft aperture located on a riser coupler of the left riser adjust arm;
a right pull arm having a right wheel hook, a right riser arm, a right riser adjust arm, and a right riser swivel arm, the left wheel hook and the right wheel hook are configured to couple to a plurality of corresponding holes disposed on the wheel, the right riser swivel arm couples to the threaded shaft via a swivel arm aperture on the right riser swivel arm;
a riser adjust pivot armature pivotably coupled to the riser coupler of the left riser adjust arm via a riser pivot pin, as a distance between the threaded shaft aperture on the left riser adjust arm and the swivel arm aperture on the right riser swivel arm decreases, the riser adjust pivot armature pivots such that the riser pivot pin pulls the left riser adjust arm in a direction to be away from a vehicle; and
wherein the wheel puller is operable to pull the wheel off of a hub of the vehicle.

2. The wheel puller, according to claim 1, wherein the hub rest is configured to press against the hub when a threaded shaft is turned while the left wheel hook and the right wheel hook are configured to pull the wheel away from the vehicle.

3. The wheel puller, according to claim 2, wherein rotation of the threaded shaft in a first rotational direction causes the left pull arm and the right pull arm to pull the left wheel hook and the right wheel hook, respectively, in a direction that moves the left wheel hook and the right wheel hook away from the vehicle.

4. The wheel puller, according to claim 1, wherein the hub rest is a contact point between the wheel puller and the hub of the wheel and stabilizes the wheel puller while pressing against the hub while the wheel puller is in use.

5. The wheel puller, according to claim 1, wherein the hub rest is coupled to the bottom plate of the hub rest bracket.

6. The wheel puller, according to claim 1, wherein the threaded shaft is rotationally coupled to the center of the top plate.

7. The wheel puller, according to claim 1, wherein the top plate is parallel to the bottom plate.

8. The wheel puller, according to claim 1, wherein the top plate is coupled to the bottom plate via a left guide swivel pin and a right guide swivel pin.

9. The wheel puller, according to claim 1, wherein the threaded shaft is a threaded rod that is rotationally coupled to the top plate of the hub rest bracket at a proximal end of the threaded shaft.

10. The wheel puller, according to claim 1, wherein a distal end of the threaded shaft includes a head where a tool is detachably coupled.

11. The wheel puller, according to claim 1, wherein the left riser guide arm restrains lateral movement of a left riser arm and, specifically, limits movement of the left riser guide arm to be parallel to the orientation of the threaded shaft and/or to be in a radial direction towards or away from the vehicle.

12. The wheel puller, according to claim 1, wherein the left riser guide arm pivotably couples to the hub rest bracket via the left guide swivel pin that passes through a left guide swivel aperture and passes through a left guide slot which is elongated to permit radial movement of the left riser arm.

13. The wheel puller, according to claim 1, wherein the right riser guide arm restrains lateral movement of the right riser arm and, specifically, limits movement of the right riser guide arm to be parallel to the orientation of the threaded shaft and/or to be in a radial direction configured to be towards or away from the vehicle.

14. The wheel puller, according to claim 1, wherein the right riser guide arm is pivotably coupled to the hub rest bracket via the right guide swivel pin that passes through a right guide swivel aperture and passes through a right guide slot which is elongated to permit radial movement of the right riser arm.

15. The wheel puller, according to claim 1, wherein the left pull arm is configured to pull the wheel away from the vehicle using the left wheel hook when the threaded shaft is turned in a first rotational direction.

16. The wheel puller, according to claim 1, wherein the left wheel hook moves towards the vehicle when the threaded shaft is turned in a second rotational direction such that clearance is created to position the left wheel hook behind the wheel.

17. The wheel puller, according to claim 16, wherein the right pull arm is configured to pull the wheel away from the vehicle using the right wheel hook when the threaded shaft is turned in the second rotational direction.

18. The wheel puller, according to claim 16, wherein the right wheel hook is configured to move towards the vehicle when the threaded shaft is turned in the second rotational direction such that clearance is created to position the right wheel hook behind the wheel.

19. The wheel puller, according to claim 1, wherein a separation angle between the left pull arm and the right pull arm is changed such that the wheel puller is operable to pull the wheel on the vehicle where the corresponding holes and the hub are not linearly aligned.

20. The wheel puller, according to claim 1, wherein a separation distance between the left wheel hook and the right wheel hook is changed to accommodate the wheel regardless of the wheel's size.

* * * * *